(12) United States Patent
Ishida

(10) Patent No.: US 8,430,699 B2
(45) Date of Patent: Apr. 30, 2013

(54) LASER WELDING STRUCTURE

(75) Inventor: Tetsuro Ishida, Tokyo (JP)

(73) Assignee: Tyco Electronics Japan G.K., Kanagawa-Ken (JP)

( * ) Notice: Subject to any disclaimer, the term of this patent is extended or adjusted under 35 U.S.C. 154(b) by 260 days.

(21) Appl. No.: 13/006,000

(22) Filed: Jan. 13, 2011

(65) Prior Publication Data
US 2011/0174785 A1 Jul. 21, 2011

(30) Foreign Application Priority Data
Jan. 15, 2010 (JP) .................................... 2010-7013

(51) Int. Cl.
*H01R 4/02* (2006.01)
*H01R 4/58* (2006.01)
(52) U.S. Cl.
USPC ........................................................ 439/874

(58) Field of Classification Search .......... 439/874–876, 439/929; 219/121.64
See application file for complete search history.

(56) References Cited

U.S. PATENT DOCUMENTS

| | | | | |
|---|---|---|---|---|
| 4,692,121 A | * | 9/1987 | Arbogast, Jr. ................. | 439/874 |
| 6,761,598 B2 | * | 7/2004 | Onizuka et al. ............... | 439/876 |
| 7,128,620 B2 | * | 10/2006 | Maura et al. .................. | 439/874 |

FOREIGN PATENT DOCUMENTS

JP 11-215652 8/1999

* cited by examiner

*Primary Examiner* — Samuel M Heinrich
(74) *Attorney, Agent, or Firm* — Barley Snyder

(57) ABSTRACT

A laser welding structure includes a housing, a lower metal terminal, and an upper metal terminal. The upper metal terminal is positioned above the lower metal terminal and has a smaller width than the lower metal terminal. The housing includes a groove and a sidewall that extends from the groove to an upper surface of the housing, wherein the sidewall faces the upper metal terminal and is inclined at an angle θ.

15 Claims, 4 Drawing Sheets

Prior Art
FIG. 5A
Prior Art
FIG. 5B
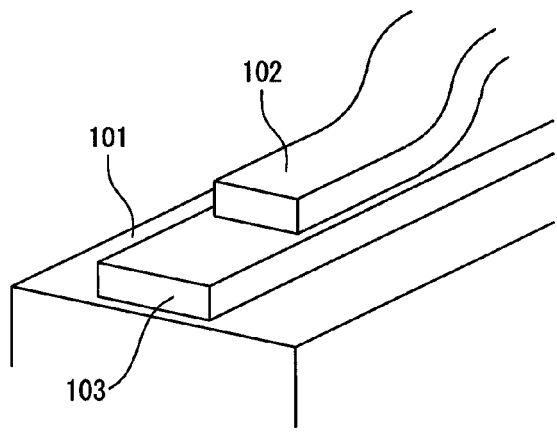
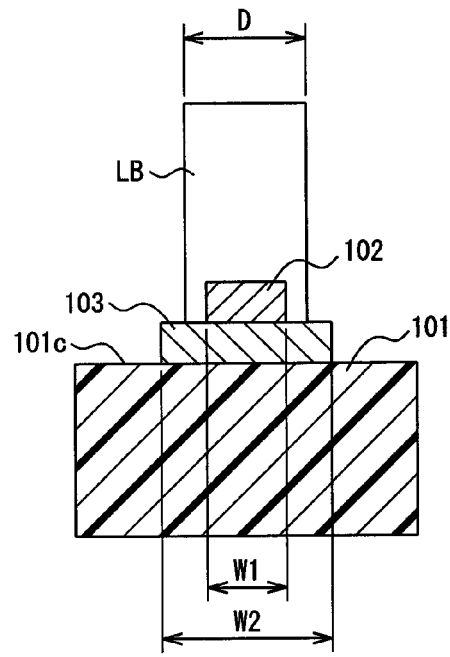
Prior Art
FIG. 6A
Prior Art
FIG. 6B
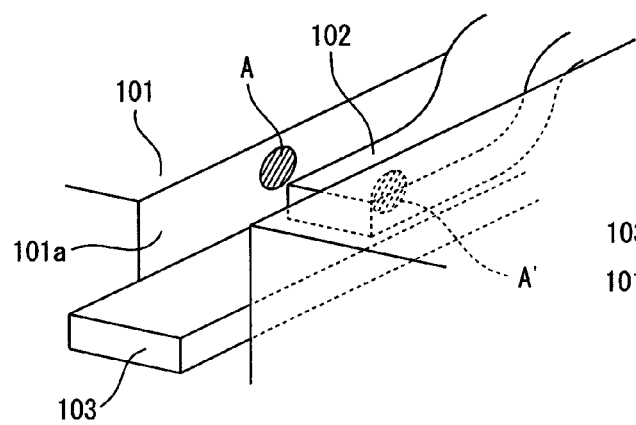
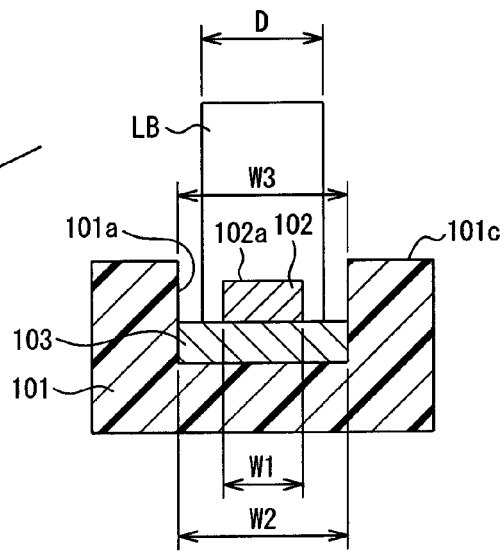

LASER WELDING STRUCTURE

CROSS-REFERENCE TO RELATED APPLICATIONS

This application claims priority under 35 U.S.C. §119 to Japanese Patent Application No. JP 2010-007013, filed Jan. 15, 2010.

FIELD OF INVENTION

The present invention relates to laser welding structures and in particular to a laser welding structure having a housing, a lower metal terminal and an upper metal terminal.

BACKGROUND

Built-in connectors in which metal terminals from leads of an electronic part, such as a diode and a relay, connect to metal terminals mounted to a housing are known. When connecting the metal terminals of the electronic part to the metal terminals in the housing, the terminals generally overlap and are then laser welded, with the metal terminals in the housing side arranged down and the metal terminals of the electronic part side arranged up. FIGS. 5A and 5B show a conventional laser welding structure for connecting metal terminals of the electronic part to metal terminals mounted to the housing by laser welding.

The laser welding structure shown in FIGS. 5A and 5B is provided with a lower metal terminal 103 on an upper surface 101c of an insulating housing 101 so as to run along the upper surface 101c thereof. As shown in FIGS. 5A and 5B, the upper metal terminal 102 is bonded onto the lower metal terminal 103 by laser welding, with the upper metal terminal 102 of the electronic part overlapped on the lower metal terminal 103. A bonded section of the lower metal terminal 103 and the upper metal terminal 102 is of an elongated shape extending in a longitudinal direction. The width W2 of the lower metal terminal 103 is wider than the width W1 of the upper metal terminal 102. Further, an irradiation diameter of a laser bean LB is defined as D. The irradiation diameter D is narrower than the width W2 of the lower metal terminal 103 and is wider than the width W1 of the upper metal terminal 102. As a result, the irradiation diameter D provides proper melting and bonding of the upper metal terminal 102 and the lower metal terminal 103.

According to the laser welding structure shown in FIGS. 5A and 5B, the structure provides proper melting and bonding of the upper metal terminal 102 and the lower metal terminal 103 while avoiding undesirable discoloration and deformation of the housing 101, due to heat generated at the time of melting and bonding. The lower metal terminal 103 is mounted on the upper surface 101c of the flat housing 1 so as to run along the upper surface 101c thereof and the periphery of the housing is free of the bonded section of the upper metal terminal 102 and the lower metal terminal 103.

However, a technique of mounting the lower metal terminal 103 on the upper surface 101c of the flat housing 1, so as to run along the upper surface 101c thereof, is generally regarded as being difficult to assemble, as it is difficult to position the lower metal terminal 103 on the upper surface 101c. For this reason, the technique is not often used in manufacturing an electrical connector. Furthermore, when many lower metal terminals 103 are arranged on the housing 101, there is a danger of a short-circuit, because of the absence of an insulator (or a housing) between the lower metal terminals 103 adjacent to each other. Thus, a widened pitch between the adjacent lower metal terminals 103 is necessary, therefore impeding miniaturization of the entire electronic part containing the built-in connector.

Accordingly, when manufacturing the electrical connecter, a structure has been adopted in which the lower metal terminal 103 and the upper metal terminal 102 are arranged in a groove 101a formed in the upper surface 101c of the housing 101. FIGS. 6A and 6B show another known laser welding structure where the metal terminal of the electronic part is connected to the metal terminal mounted to the housing by laser welding. In the laser welding structure, the lower metal terminal 103 is arranged in the groove 101a formed in the insulating housing 101. The groove 101a is of a shape of extending in a longitudinal direction so as to correspond to a shape of the lower metal terminal 103. When arranging the lower metal terminal 103 in the grove 101a, it has been prevalent in general techniques, such as press-fitting and insert molding. Then, the upper metal terminal 102 is bonded on the lower metal terminal 103 by laser welding, with the upper metal terminal 102 of the electronic parts overlapped on the lower metal terminal 103. Herein, as shown in FIGS. 6A and 6B, the upper metal terminal 102 and the lower metal terminal 103 are arranged in the groove 101a, in a state where the upper surface 101c of the surrounding housing 101 is positioned higher than the upper surface 102a of the upper metal terminal 102.

As shown in FIGS. 6A and 6BB, the width W2 of the lower metal terminal 103 is wider than the width W1 of the upper metal terminal 102. Moreover, the irradiation diameter of the laser beam LB is D, which is narrower than the width W2 of the lower metal terminal 103 and is wider than the width W1 of the upper metal terminal 102. Additionally, the width W3 of an opening of the groove 101a is the same as the width W2 of the lower metal terminal 103 and is wider than the irradiation diameter D of the laser beam LB.

According to the laser welding structure shown in FIGS. 6A and 6B, the structure facilitates mounting of the lower metal terminal 103 in the groove 101a by the techniques such as press-fitting and insert molding. Further, when many lower metal terminals 103 are arranged in the housing 101, the insulator interposed between the lower metal terminals 103 adjacent to each other eliminates a danger of short-circuit, thereby attaining a narrow pitch design. This favorably contributes to miniaturization of the entire electronic part with built-in connector.

FIG. 7 is a perspective view of another known laser welding structure, as disclosed in Japanese Published Unexamined Application No. 11-215652. The laser welding structure shown in FIG. 7 is for bonding by laser welding a bend allowance part 202a of a tab terminal 202 on a bus bar (or lower metal terminal) 201 to be received in an electrical junction box (not shown). When performing laser welding, thin-walled sections 202b-202d are formed at the bend allowance part 202a of the tab terminal 202 and the laser beam LB is irradiated on these thin-walled sections 202b-202d from an oblique direction.

The known laser welding structures shown in FIGS. 6A, 6B, and 7, however, include several shortcomings. In other words, referring to FIGS. 6A and 6B, when the laser beam LB is irradiated to welding the upper metal terminal 102 and the lower metal terminal 103, heat generated by irradiation of the laser beam LB can cause discoloration or deformation of both side walls in the groove 101a of the hosing 101. Specifically, as shown in FIGS. 6A and 6B, a region A and a region A' facing corresponding portions at which the upper metal terminal 102 begins melting by irradiation of the laser beam LB may cause discoloration or deformation due to melting and bonding heat.

Where the bus bar 201 of FIG. 7 is arranged along the housing, it is free from a danger of discoloration or deformation due to heat generated by melting and bonding but it is liable to cause an increase in size of an apparatus. In some instances, where the bus bar 210 is arranged in the groove of the housing and surrounds therewithin the bus bar 201 and the tab terminal 202, the structure can cause discoloration or deformation due to heat generated by melting and bonding.

SUMMARY

Accordingly, the invention has been made to solve the above problems, and an object thereof, among other objects is to provide a laser welding structure in which an upper metal terminal and a lower metal terminal are arranged in a groove of a housing, where an upper surface of the surrounding housing is positioned higher than an upper surface of the upper metal terminal. The housing is design such that is not subjected to harmful effects caused by melting and bonding heat generated at the time of laser welding, such as discoloration or deformation.

The laser welding structure includes a housing, a lower metal terminal, and an upper metal terminal. The upper metal terminal is positioned above the lower metal terminal and has a smaller width than the lower metal terminal. The housing includes a groove and a sidewall that extends from the groove to an upper surface of the housing, wherein the sidewall faces the upper metal terminal and is inclined at an angle θ.

BRIEF DESCRIPTION OF THE DRAWING(S)

The invention will be described in detail with reference to the following figures of which:

FIGS. 1A and 1B is a sectional view taken along a width direction of metal terminals of the laser welding structure shown in FIGS. 1A and 1B;

FIG. 5A is a perspective view of a known laser welding structure according to the invention;

FIG. 5B is a sectional view taken along a width direction of metal terminals of the known laser welding structure shown in FIG. 5A;

FIG. 6A is a perspective view of another known laser welding structure according to the invention;

FIG. 6B is a sectional view taken along a width direction of metal terminals of the known laser welding structure shown in FIG. 6A.

DETAILED DESCRIPTION OF THE EMBODIMENT(S)

Hereafter, an embodiment of the invention will be described with reference to the drawings.

First, an embodiment of the laser welding structure will be described with reference to FIGS. 1A and 1B.

Figure 1A:
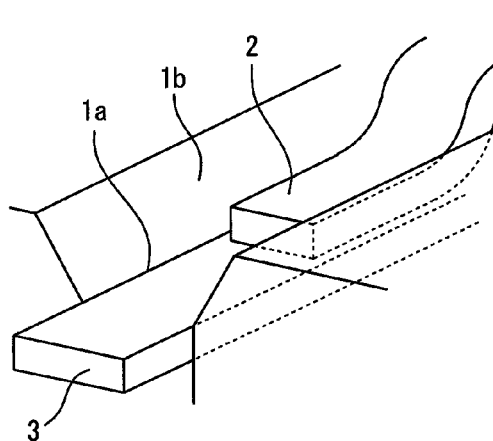
FIGS. 1A and 1B is a perspective view of a laser welding structure according to the invention.
Figure 1B:
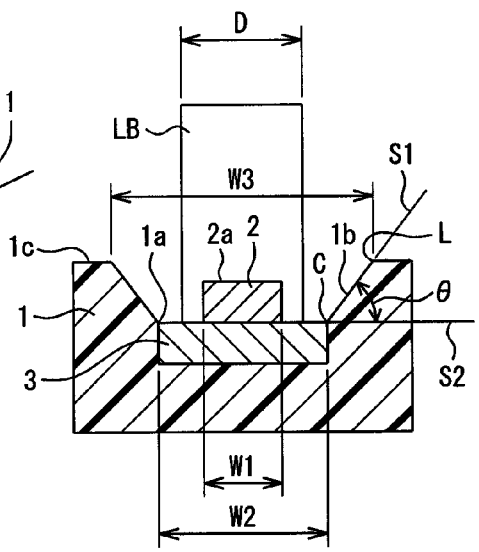

The laser welding structure shown in FIGS. 1A and 1B is used for an electronic part built-in connector, in which an upper metal terminal 2 of leads, such as a diode and a relay, is connected to a lower metal terminal 3, which is mounted to a housing 1. The lower metal terminal 3 may be a solder connecting portion or a contact portion of a contact of the connector having the housing 1 and the contact (not shown), or may instead thereof be a fixed part of a metal shell of the connector to the housing.

Herein, the laser welding structure is laser welded overlapping, with the lower metal terminal 3 having a wider width arranged down and the upper metal terminal 2 having a width narrower than that of the lower metal terminal 3. Additionally, the upper metal terminal 2 and the lower metal terminal 3 are arranged in a groove 1a of the housing 1, where an upper surface 1c of the surrounding housing 1 is positioned higher than an upper surface 2a of the upper metal terminal 2 that is opposite the lower metal terminal 3.

In the laser welding structure, the lower metal terminal 3 is arranged in the groove 1a formed in the insulating housing 1. The groove 1a is of a shape extending in a longitudinal direction in correspondence to that of the lower metal terminal 3. When mounting the lower metal terminal 3 in the groove 1a, technologies such as press-fitting and insert molding may be used. The upper metal terminal 2 of the electronic part and the lower metal terminal 3 are laser welded in an overlapping manner, utilizing technologies to bond the upper metal terminal 2 to the lower metal terminal 3. As previously discussed, the upper metal terminal 2 and the lower metal terminal 3 are arranged in the groove 1a of the housing 1, where the upper surface 1c of the surrounding housing 1 is positioned higher than the upper surface 2a of the upper metal terminal 2, as shown in FIGS. 1A and 1B.

The bonded section of the upper metal terminal 2 and the lower metal terminal 3 is of an elongated shape of extending in a longitudinal direction as shown in FIGS. 1A and 1B. As shown in FIGS. 1A and 1B, the width W2 of the lower metal terminal 3 is wider than the width W1 of the upper metal terminal 2. An irradiation diameter D of a laser beam LB is less than the width W2 of the lower metal terminal 3 and is greater than the width W1 of the upper metal terminal 2. The setting of the irradiation diameter D as such enables proper melting and bonding of the upper metal terminal 2 and the lower metal terminal 3.

A sidewall 1b facing the upper metal terminal 2 is positioned in the groove 1a and is inclined at an angle θ from an lower end crease C in a width direction of the lower metal terminal 3 as shown in FIGS. 1A and 1B. That is, the sidewall 1b facing the upper metal terminal 2 is inclined, extending at the angle θ made between a line S1 and a plane S2. The line S1 connects and passes through the lower end crease and a point of intersection L between sidewall and the upper surface 1c of the housing 1, defined as an upper end crease, and the plane S2 extends from the upper surface of the lower metal terminal 3. Thereby, the width W3 of the uppermost edge of an opening in the groove 1a is wider than the width of a lower portion in the groove 1a that is set equal to the width W2 of the lower metal terminal 3. The sidewall 1b facing the upper metal terminal 2 is inclined at the angle θ over the full length of the groove 1a and is formed in the shape of a straight plane, viewing from a section crossing in the width direction.

In this manner, the sidewall 1b facing the upper metal terminal 2 is inclined at the angle θ between the line S1 and the plane S2. The line S1 connects and passes through the lower end crease and a point of intersection L between sidewall and the upper surface 1c of the housing 1, defined as the upper end crease, and the plane S2 extends from the upper surface of the lower metal terminal 3. As a result, portions of the sidewall 1b facing the upper metal terminal 2 (parts corresponding to regions A and A' shown in FIGS. 6A and 6B), at which the upper metal terminal 2 begins melting by irradiation of a laser beam LB, are inclined and displaced from the heat source (heat source of the melting and bonding heat). Consequently, the structure avoids mitigates harmful influences, such as discoloration and deformation on the parts of the housing 1, due to the melting heat in laser welding.

The relationship of the width W1 of the upper metal terminal 2, the width W2 of the lower metal terminal 3, the width W3 of the uppermost edge of the opening of the groove 1a, and the irradiation diameter D of the laser beam LB is defined as follows.

$$W1 < D < W2 < W3 \quad (1)$$

Based on equation (1), it is desirable to set the angle θ between 15° and 75° as represented by the following equation (2), $$15° <= θ <= 75° \quad (2)$$

Accordingly, in order to prevent discoloration and deformation of the housing and to minimize pitch of the contacts the angle θ, in the embodiment shown and being described, is set to an angle more than or equal to 15° and less than or equal to 75°. In furtherance, the angle θ in the embodiment shown may alternatively be set to an angle more than or equal to 30° and less than or equal to 60°, and further set to an angle more than or equal to 40° and less than or equal to 50°. In fact in the embodiment shown, the angle θ is set to an angle of 45°, as one way to balance the desire of preventing the discoloration and deformation of the housing 1, and the desire of making a pitch smaller between the lower metal terminals 3.

The arrangement of the upper metal terminal 2 and the lower metal terminal 3 in the groove 1a of the housing 1 facilitates mounting of the lower metal terminal 3 in the groove 1a by the technologies, such as press-fitting or insert molding. Also, adding an isolator interposed between adjacent lower metal terminals adjacent may remove a chance of a short-circuit.

The sidewall 1b, which faces the upper metal terminal 2 in the groove 1a, is inclined from the lower end crease C in the width direction of the lower metal terminal 3. Hence, holding strength of the lower metal terminal 3 within the groove 1a is maintained, since the inclination of the sidewall 1b starts above the lower end crease C.

A description of a second embodiment of the laser welding structure of the present invention will next be made referring to FIG. 2.

Figure 2A:
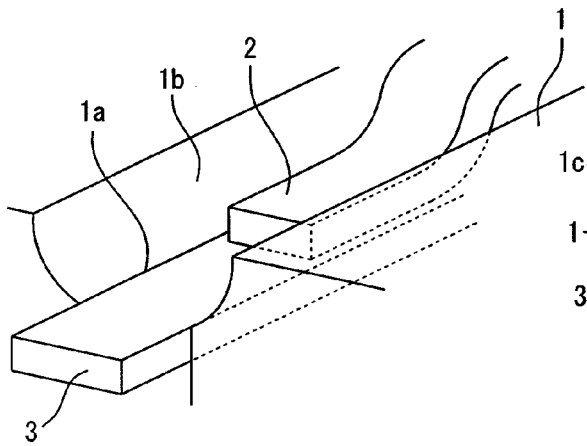
FIG. 2A is a perspective view of another laser welding structure according to the invention.
Figure 2B:
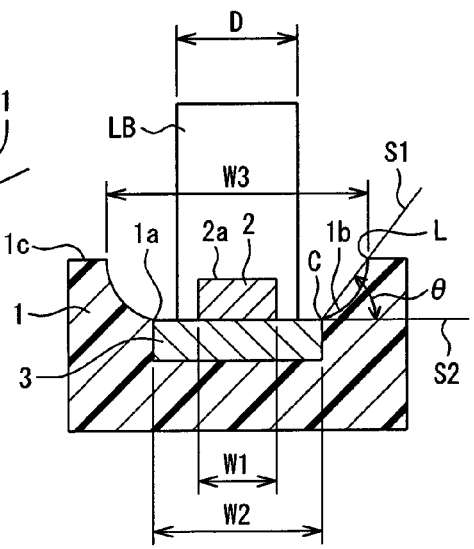
FIG. 2B is a sectional view taken along a width direction of metal terminals of the laser welding structure shown in FIG. 2A.

While the laser welding structure shown in FIGS. 2A and 2B substantially has the same structure as that shown in FIGS. 1A and 1B, the laser welding structure shown in FIGS. 2A and 2B differs in that the sidewall 1b facing the upper metal terminal 2 has a different geometry than the sidewall 1b shown in FIGS. 1A and 1B.

More specifically, the geometry of the sidewall 1b facing the upper metal terminal 2 shown in FIGS. 1A and 1B is inclined at the angle θ between the line S1 and the plane S2. The line S1 connects and passes through the lower end crease and a point of intersection L between sidewall and the upper surface 1c of the housing 1, defined as the upper end crease, and the plane S2 extends from the upper surface of the lower metal terminal 3. The sidewall 1b facing the upper metal terminal 2 is inclined at the angle θ over the full length of the groove 1a, as shown in FIGS. 1A and 1B, and is formed in the shape of a straight plane, viewing from the section crossing in the width direction.

Meanwhile, the sidewall 1b facing the upper metal terminal 2 shown in FIGS. 2A and 2B is inclined at the angle θ between the line S1 and the plane S2. The line S1 connects and passes through the lower end crease and a point of intersection L between sidewall and the upper surface 1c of the housing 1, defined as the upper end crease, and the plane S2 extends from the upper surface of the lower metal terminal 3. However, the sidewall 1b facing the upper metal terminal 2 is curved concave in the downward direction relative to the line S1, when viewed from a cross section in a width direction, as shown in FIG. 2B. The sidewall 1b is continuously curved over the full length of the groove 1a.

In this manner, the sidewall 1b facing the upper metal terminal 2 is curved relative to the line S1 and the point of intersection L. As a result, portions of the sidewall 1b facing the upper metal terminal 2 (parts corresponding to regions A and A' shown in FIGS. 6A and 6B), at which the upper metal terminal 2 begins melting by irradiation of a laser beam LB, is curved and therefore displaced from the heat source (heat source of the melting and bonding heat), which is similar to the sidewall having an inclination in the shape of the straight plane, as shown in FIGS. 1A and 1B, Accordingly, the laser welding structure according to the invention is less likely to be subjected to harmful influences such as discoloration and deformation of the housing 1.

In addition, a relationship between the width W1 of the upper metal terminal 2, the width W2 of the lower metal terminal 3, and the width W3 of the uppermost edge of the an opening of the groove 1a, and the irradiation diameter D of the laser beam LB is expressed through equation (1).

The angle θ, in the embodiment shown and being described, is set to an angle more than or equal to 15° and less than or equal to 75°. In furtherance, the angle θ in the embodiment shown may be further set to an angle more than or equal to 30° and less than or equal to 60°, and further set to an angle more than or equal to 40° and less than or equal to 50°. In fact, in the embodiment shown, the angle θ is set to an angle of 45°, taking account of a request of preventing the discoloration and deformation of the housing 1, and of making a pitch smaller between the lower metal terminals 3 adjacent to each other.

A description of another embodiment of the laser welding structure according to the invention will be discussed with reference to FIGS. 3A and 3B.

Figure 3A:
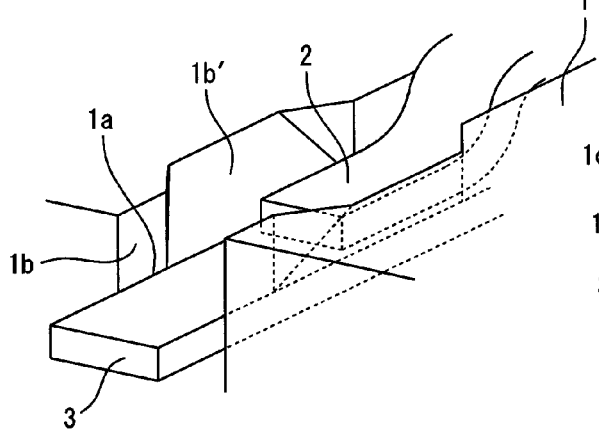
FIG. 3A is a perspective view of another laser welding structure according to the invention.
Figure 3B:
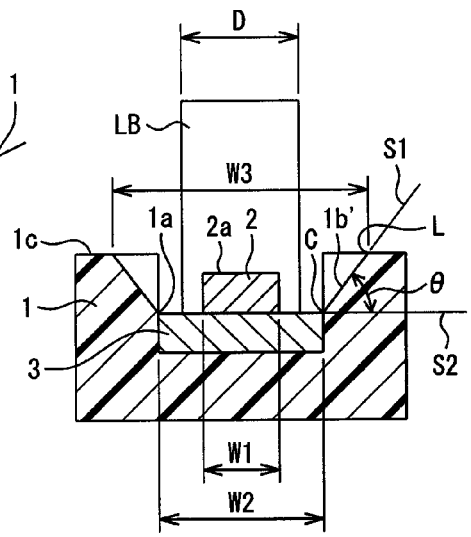
FIG. 3B is a sectional view taken along a width direction of metal terminals of the laser welding structure shown in FIG. 3A.

While the laser welding structure shown in FIGS. 3A and 3B substantially has the same structure as that of the laser welding structure shown in FIGS. 1A and 1B, there is a difference between the laser welding structure shown in the FIGS. 3A and 3B and the laser welding structure illustrated in FIGS. 1A and 1B, which includes a sidewall 1b having an inclination (by angle θ) over an entirety of the sidewall 1b facing the upper metal terminal 2.

Namely, the geometry of the sidewall 1b facing the upper metal terminal 2 shown in FIGS. 1A and 1B is inclined at the angle θ made between the line S1 and the point of intersection L. The sidewall 1b facing the upper metal terminal 2 is inclined at the angle θ over the full length of the groove 1a, as shown in FIGS. 1A and 1B, and is formed in the shape of the straight plane, viewing from the section crossing in the width direction.

In contrast, the sidewall 1b facing the upper metal terminal 2 as shown in FIGS. 3A and 3B is inclined only at its inner sidewall 1b' relative to the full length of the groove 1a at the angle θ between the line S1 and the plane S2. The line S1 connects and passes through the lower end crease and a point of intersection L between sidewall and the upper surface 1c of the housing 1, defined as the upper end crease, and the plane S2 extends from the upper surface of the lower metal terminal 3. Further, the inner sidewall 1b' is formed only at a section corresponding to the laser welded section of the upper metal terminal 2 and the lower metal terminal 3 viewing from above, and is inclined at the angle θ out of the sidewall 1b. Also, the sidewall 1b' is cutout in a trapezoidal form, when viewed from above and is formed in the shape of the straight plane, when viewed from a cross section in the width direction.

The sidewall 1b facing the upper metal terminal 2 rises perpendicularly from a downward direction and a lower surface f the housing 1, without any inclination, unlike how it is shown in the FIGS. 1A and 1B. Rather, the inner sidewall 1b' inclines at the angle θ. As a result, a section of the housing 1, which corresponds to the inner sidewall 1b' and similarly corresponding to regions A and A' shown in FIGS. 6A and 6B, is displaced from the upper metal terminal 2 which is exposed to irradiation of a laser beam LB. Furthermore, the section, which is displaced from the heat source, is limited to a specific region that may be affected by the heat source, rather than an entirety of the sidewall 1b. Consequently, it follows that an only essential part out of the sidewall 1b facing the upper metal terminal 2 is inclined at the angle θ, thereby striving for downsizing of the housing 1.

Again, a relationship between the width W1 of the upper metal terminal 2, the width W2 of the lower metal terminal 3, and the width W3 of the uppermost edge of the an opening of the groove 1a, and the irradiation diameter D of the laser beam LB in the embodiment shown is explained through the aforesaid equation (1).

The angle θ, in the embodiment shown and being described, is set to an angle more than or equal to 15° and less than or equal to 75°. In furtherance, the angle θ in the embodiment shown may be further set to an angle more than or equal to 30° and less than or equal to 60°, and further set to an angle more than or equal to 40° and less than or equal to 50°. In fact, in the embodiment shown, the angle θ is set to an angle of 45°, taking account of a request of preventing the discoloration and deformation of the housing 1, and of making a pitch smaller between the lower metal terminals 3 adjacent to each other.

Finally, another embodiment of the laser welding structure according to the present invention will be described referring to FIGS. 4A and 4B.

Figure 4A:
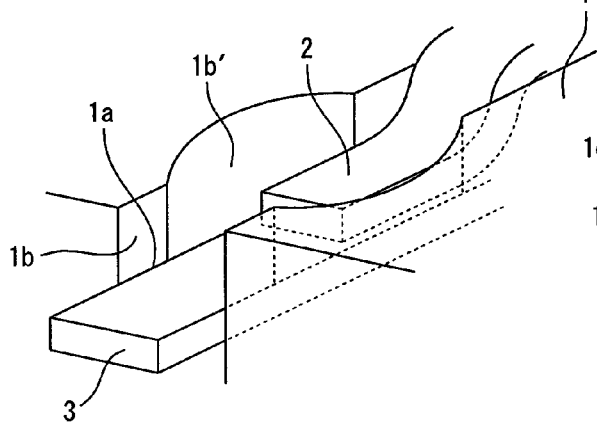
FIG. 4A is a perspective view of another laser welding structure according to the invention.
Figure 4B:
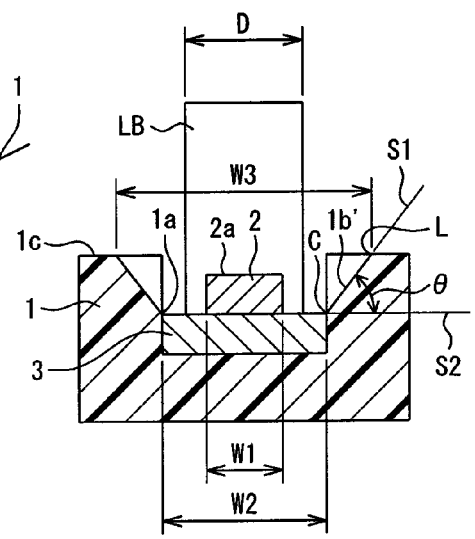
FIG. 4B is a sectional view taken along a width direction of metal terminals of the laser welding structure shown in FIG. 4A.
Figure 7:
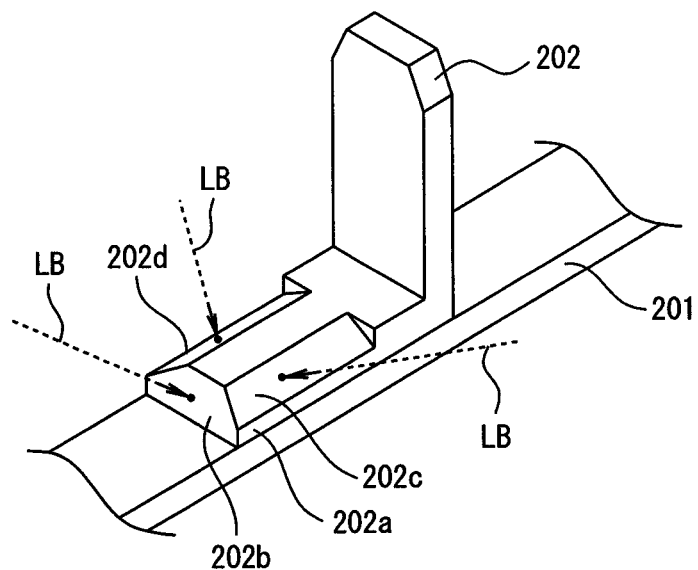
FIG. 7 is a perspective view of another example of a known laser welding structure.

The laser welding structure shown in FIGS. 4A and 4B has substantially the same structure as that shown in FIGS. 3A and 3B. However, the inner sidewall 1b' in FIGS. 4A and 4B differs from that shown in FIGS. 3A and 3B in that the inner sidewall 1b' differes in geometry.

In other words, the inner sidewall 1b' in FIGS. 3A and 3B is cutout in a trapezoidal form, when viewed from above and is formed in the shape of the straight plane, when viewed from a cross section in the width direction. In contrast, the inner sidewall 1b' in FIG. 4B is formed having a curved shape, as viewed from above and in the straight plane when viewed from a cross section in the width direction. The inner sidewall 1b' is formed to be curved having a concave shape, as clearly shown in FIG. 4A.

As can be seen from the above, forming the sidewall 1b' in a curved, concave shape and inclining at an angle θ out of the sidewall 1b exerts the same effect as that of the laser welding structure shown in FIGS. 3A and 3B.

As is illustrated in FIGS. 3A and 3B, the inner sidewall 1b' out of the sidewall 1b facing the upper metal terminal 2 shown in FIGS. 4A and 4b is inclined at the angle θ between the line S1 and the plane S2. The line S1 connects and passes through the lower end crease and a point of intersection L between sidewall and the upper surface 1c of the housing 1, defined as the upper end crease, over the full length of the groove 1a, as shown in FIGS. 4A and 4B, in the same way as the sidewall 1b shown in FIGS. 3A and 3B. The inner sidewall 1b' inclined at the angle θ out of the sidewall 1b facing the upper metal terminal 2 is formed only along a section that corresponds to the laser welded section of the upper metal terminal 2 and the lower metal terminal 3, when viewed from above.

In addition, a relationship between the width W1 of the upper metal terminal 2, the width W2 of the lower metal terminal 3, and the width W3 of the uppermost edge of the an opening of the groove 1a, and the irradiation diameter D of the laser beam LB is explained through the aforesaid equation (1).

The angle θ, in the embodiment shown and being described, is set to an angle more than or equal to 15° and less than or equal to 75°. In furtherance, the angle θ in the embodiment shown may be further set to an angle more than or equal to 30° and less than or equal to 60°, and further set to an angle more than or equal to 40° and less than or equal to 50°. In fact, in the embodiment shown, the angle θ is set to an angle of 45°, taking account of a request of preventing the discoloration and deformation of the housing 1, and of making a pitch smaller between the lower metal terminals 3 adjacent to each other.

While the description refers to embodiments of the invention, the invention may have various modifications and improvements without being limited thereto.

For example, the laser welding structure of the invention is not limited to the electronic part built-in connector in which the upper metal terminal 2 of leads etc., of the electronic part, such as a diode and a relay, are connected to the lower metal terminal 3 mounted to the housing 1. It may also be applied to other parts/components/articles which are fabricated by laser welding, with a wider metal terminal and a metal terminal narrower than the lower metal terminal being overlapped.

In the embodiments shown in FIGS. 3A through 4B, the inner sidewall 1b' inclined at the angle θ out of the sidewall 1b facing the upper metal terminal 2 is formed in the shape of a straight plane, when viewed from a cross section in the width direction. Alternatively, the inner sidewall 1b' may be curved concave in the downward direction relative to the line S1 connecting the lower end crease C in the width direction of the lower metal terminal 3 crossing in the width direction and the point of intersection L intersecting with the upper surface 1c of the housing 1.

Furthermore, in the embodiments shown in FIGS. 1 to 4, since the part of the wall of the housing 1 sectioning the groove 1a is closely contacted to the side of the lower metal terminal 3, the starting point of the inclined portion of the sidewalls 1b and inner sidewalls 1b' coincides with the upper edge C in the width direction of the lower metal terminal 3. Instead, a gap may be provided between the wall of the housing 1 and the side of the lower metal terminal 3. In this instance, the inclined portions of the sidewalls 1b and inner sidewalls 1b' may form a ridge line nearest to the side of the lower metal terminal 3.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

The invention claimed is:

1. A laser welding structure, comprising:
a lower metal terminal;
an upper metal terminal positioned on top of the lower metal terminal and having an upper surface opposite the lower metal terminal, the upper metal terminal having a smaller width than the lower metal terminal;
a housing having a groove and a sidewall extending from the groove at a lower end crease to an upper surface of the housing at an upper end crease;
wherein the upper metal terminal and the lower metal terminal are arranged in the groove and the upper surface of the housing is positioned above the upper surface of the upper metal terminal;
wherein the sidewall faces the upper metal terminal and is inclined extending at an angle θ made between a plane including the upper surface of the lower terminal and a line passing through the lower end crease and the upper end crease.

2. The laser welding structure according to claim 1, wherein the angle θ is more than or equal to 15° and less than or equal to 75°.

3. The laser welding structure according to claim 2, wherein the sidewall is inclined along a section that corresponds to a laser welded section of the upper metal terminal and the lower metal terminal.

4. The laser welding structure according to claim 1, wherein the sidewall is inclined along a section that corresponds to a laser welded section of the upper metal terminal and the lower metal terminal.

5. The laser welding structure according to claim 1, wherein the sidewall is concaved curved.

6. The laser welding structure according to claim 3, wherein the sidewall is concaved curved.

7. The laser welding structure according to claim 1, wherein a width of an uppermost edge of an opening in the groove is wider than the width of a lower portion in the groove that is set equal to the width of the lower metal terminal.

8. The laser welding structure according to claim 1, wherein the sidewall is inclined at the angle θ over a full length of the groove and is formed in a shape of a plane when viewed from a cross section crossing in a width direction of the laser welding structure.

9. A laser welding structure, comprising:
a lower metal terminal;
an upper metal terminal positioned above the lower metal terminal and having a smaller width than the lower metal terminal; and
a housing having a groove, a sidewall extending from the groove to an upper surface of the housing, and an inner sidewall formed at a section corresponding to a laser welded section of the upper metal terminal and the lower metal terminal when viewed from above;
wherein the upper metal terminal and the lower metal terminal are arranged in the groove and the upper surface of the housing extends above an upper surface of the upper metal terminal;
wherein the sidewall faces the upper metal terminal and is inclined extending at an angle θ made between a plane including the upper surface of the lower terminal and a line passing through the lower end crease and the upper end crease.

10. The laser welding structure according to claim 9, wherein the sidewall extends perpendicular from the groove to the upper surface of the housing.

11. The laser welding structure according to claim 9, wherein the inner sidewall is inclined at the angle θ out of the sidewall.

12. The laser welding structure according to claim 11, wherein the inner sidewall is cutout of the housing in a trapezoidal form when viewed from above and is formed in the shape of the straight plane when viewed from a cross section in a width direction of the laser welding structure.

13. The laser welding structure according to claim 9, wherein the angle θ is more than or equal to 15° and less than or equal to 75°.

14. The laser welding structure according to claim 9, wherein the inner sidewall is concavely curved from a downward direction.

15. The laser welding structure according to claim 9, wherein a width of an uppermost edge of an opening in the groove is wider than the width of a lower portion in the groove that is set equal to the width of the lower metal terminal.

* * * * *